United States Patent
Shahbazian-Yassar et al.

(10) Patent No.: US 11,699,806 B2
(45) Date of Patent: Jul. 11, 2023

(54) THIN NANOCOATING SEPARATORS FOR BATTERIES

(71) Applicant: THE BOARD OF TRUSTEES OF THE UNIVERSITY OF ILLINOIS, Urbana, IL (US)

(72) Inventors: Reza Shahbazian-Yassar, Chicago, IL (US); Tara Foroozan, Chicago, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 179 days.

(21) Appl. No.: 16/784,491

(22) Filed: Feb. 7, 2020

(65) Prior Publication Data

US 2020/0259150 A1 Aug. 13, 2020

Related U.S. Application Data

(60) Provisional application No. 62/802,640, filed on Feb. 7, 2019.

(51) Int. Cl.
| | |
|---|---|
| *H01M 50/449* | (2021.01) |
| *H01M 10/052* | (2010.01) |
| *H01M 4/38* | (2006.01) |
| *H01M 50/44* | (2021.01) |
| *H01M 50/403* | (2021.01) |
| *H01M 50/431* | (2021.01) |
| *H01M 4/02* | (2006.01) |

(52) U.S. Cl.
CPC ......... *H01M 50/449* (2021.01); *H01M 4/382* (2013.01); *H01M 10/052* (2013.01); *H01M 50/403* (2021.01); *H01M 50/431* (2021.01); *H01M 50/44* (2021.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 7,691,528 | B2* | 4/2010 | Hennige | H01M 50/409 429/144 |
| 2005/0041362 | A1* | 2/2005 | Hall | B64D 45/02 361/225 |
| 2012/0189897 | A1* | 7/2012 | Wakizaka | H01M 50/403 429/144 |
| 2020/0328394 | A1* | 10/2020 | Song | H01M 50/417 |

FOREIGN PATENT DOCUMENTS

| | | | |
|---|---|---|---|
| CN | 106129455 | * | 11/2016 |
| WO | WO 2018/124636 | * | 7/2018 |

OTHER PUBLICATIONS

Machine translation of CN 106129455, published on Nov. 16, 2016 (Year: 2016).*
Burress, J.W., Gadipelli, S., Ford, J., Simmons, J.M., Zhou, W., Yildirim, T.—Graphene Oxide Framework Materials: Theoretical Predictions and Experimental Results, Angew. Chem. Intl. Ed., 2010, 49, pp. 8902-8904 (Year: 2010).*

* cited by examiner

*Primary Examiner* — Anca Eoff
(74) *Attorney, Agent, or Firm* — McDonnell Boehnen Hulbert & Bergthoff LLP

(57) ABSTRACT

The disclosure provides a battery and methods for making and using the battery. The battery includes (a) a separator that is woven and porous, and (b) a graphene oxide (GO) nanosheet coating coupled to a surface of the separator. The GO nanosheet coating is configured as a buffer layer to permit transport of Li-ions therethrough and to regulate a rate of flow of the transport of the Li-ions.

24 Claims, 10 Drawing Sheets

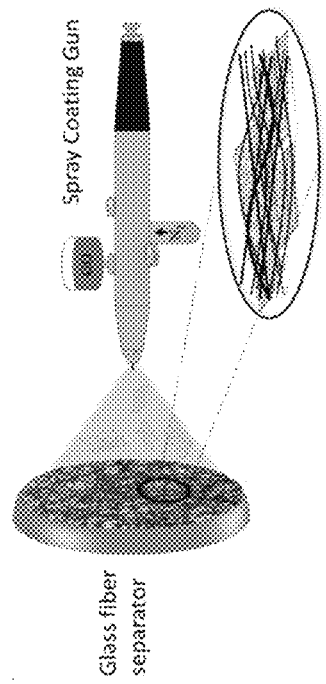
FIG. 1E
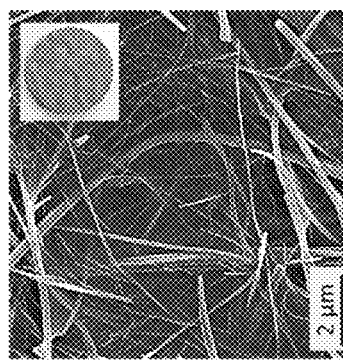
FIG. 1G
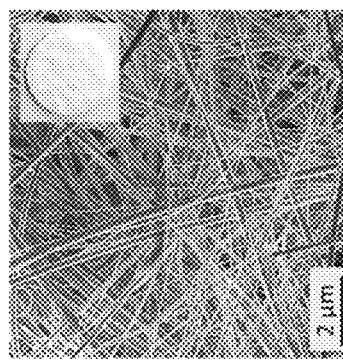
FIG. 1F
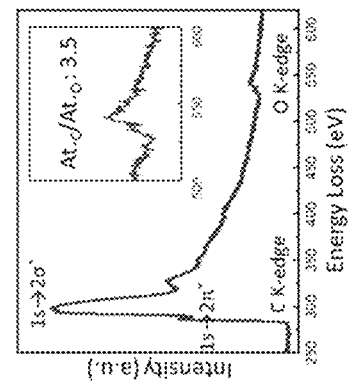
FIG. 1B
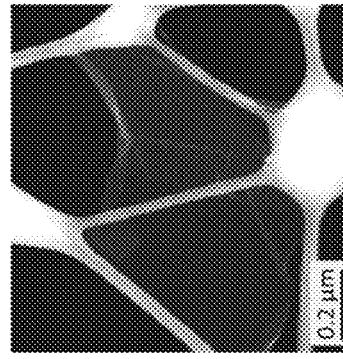
FIG. 1D
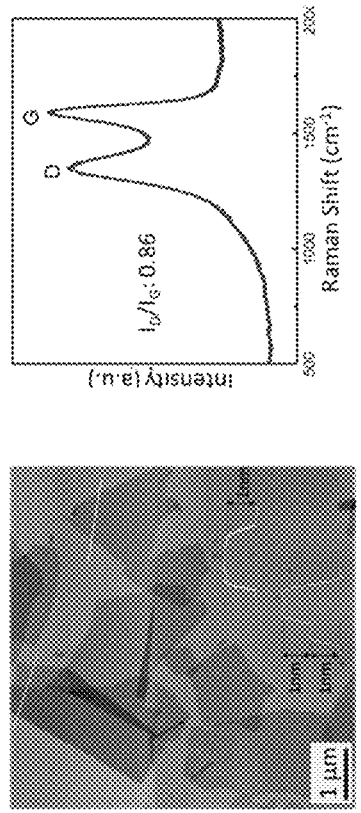
FIG. 1A
FIG. 1C

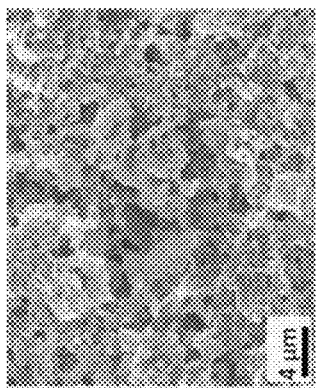
FIG. 2D
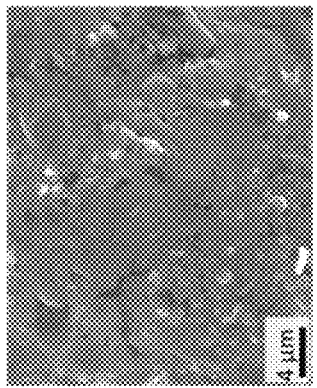
FIG. 2E
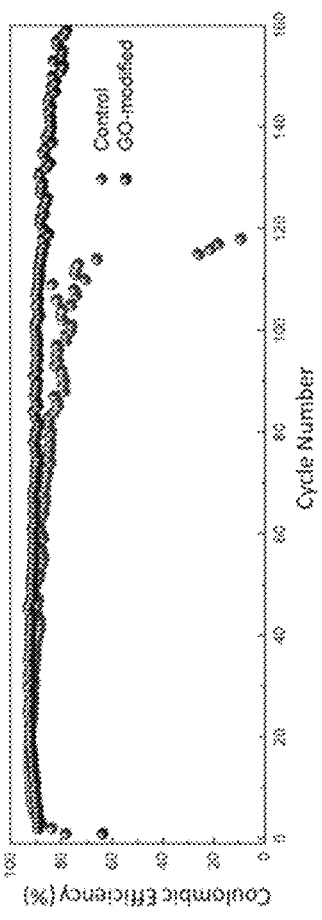
FIG. 2A
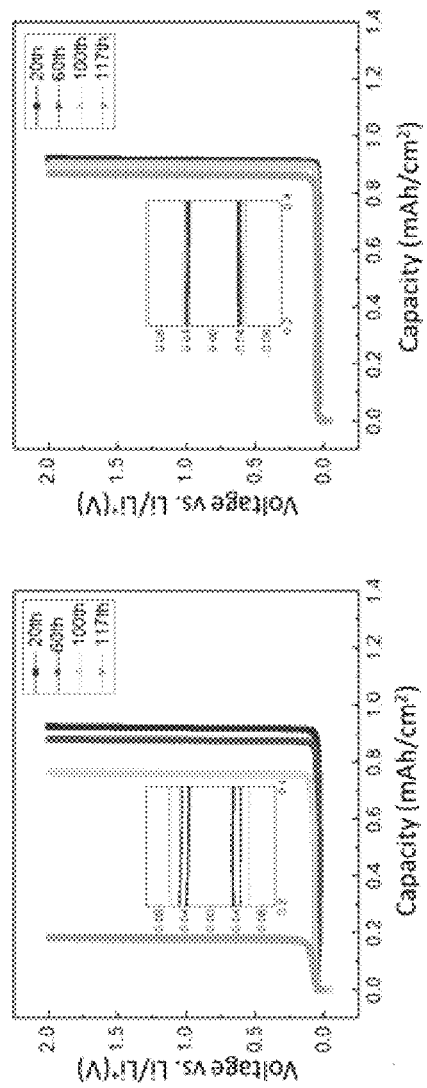
FIG. 2B
FIG. 2C

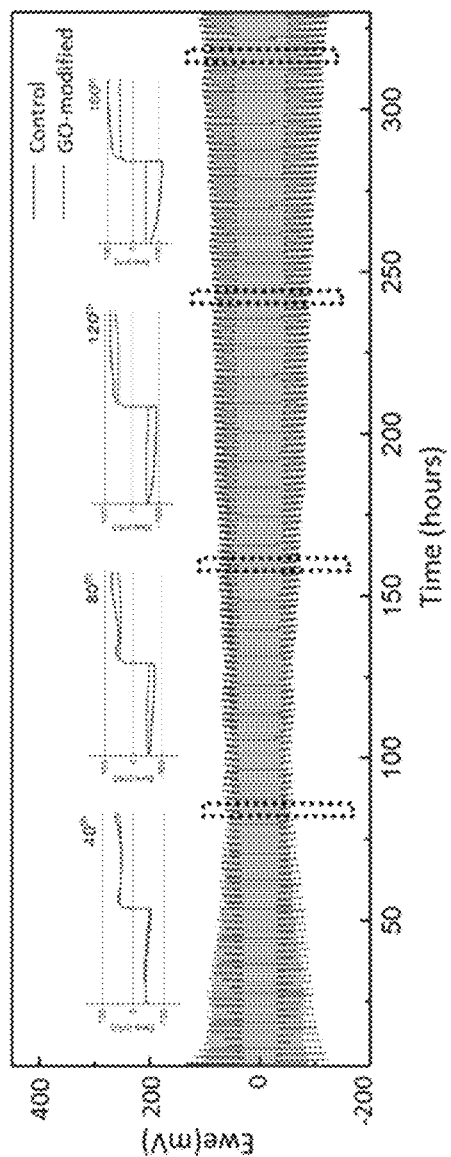
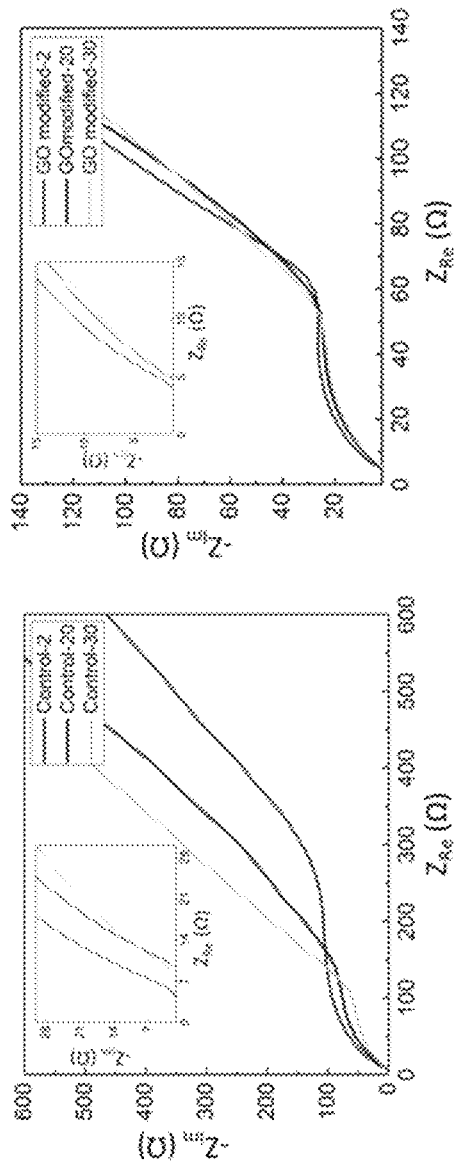
FIG. 3A
FIG. 3B
FIG. 3C

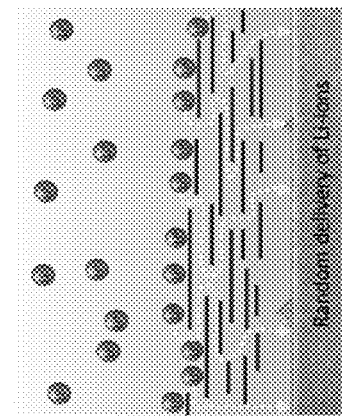
FIG. 5A
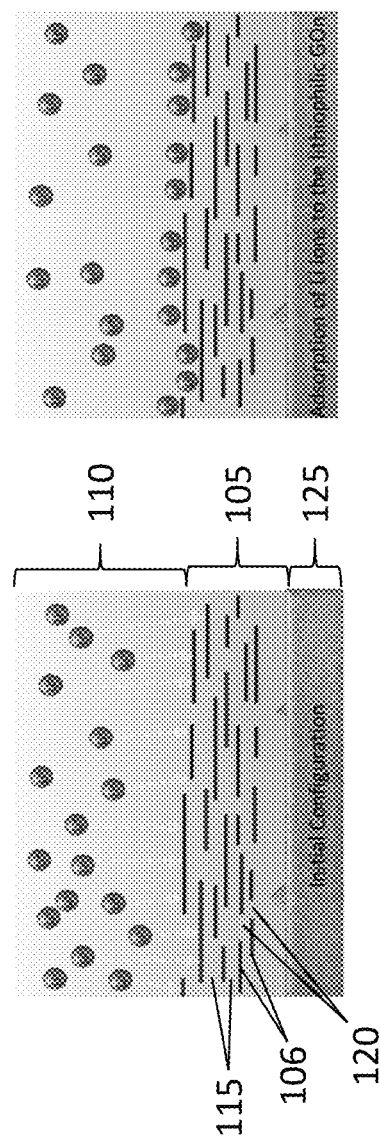
FIG. 5B
FIG. 5C
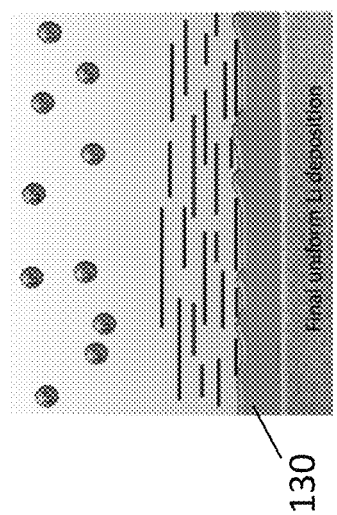
FIG. 5D
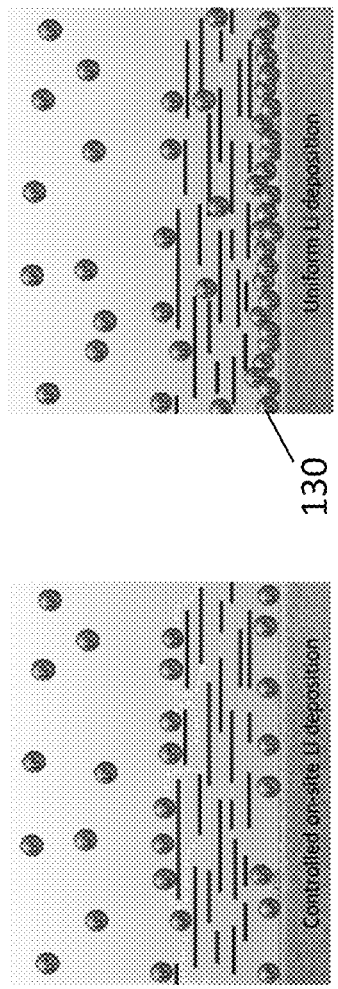
FIG. 5E
FIG. 5F

THIN NANOCOATING SEPARATORS FOR BATTERIES

CROSS-REFERENCE TO RELATED APPLICATION

This Application claims the benefit of the filing date of U.S. Non-Provisional Patent Application Ser. No. 62/802,640, filed Feb. 7, 2019, which is hereby incorporated by reference in its entirety.

STATEMENT OF GOVERNMENT INTEREST

The present disclosure was made with support from the National Science Foundation (Award No. DMR-1620901).

FIELD OF THE DISCLOSURE

The present disclosure is directed to improved battery structures. Specifically, the disclosure is directed to battery structures incorporating a porous separator and a thin, three dimensional coating therein for regulating the transport of ions and suppression of lithium dendrites during operation.

BACKGROUND

The state-of-the art Li-ion batteries (LIBs) are reaching their theoretical energy density limits. Hence, the urge for finding substitution materials with ultra-high energy density is critical for the next generation of batteries. Some previous reports have used carbon materials such as rGO and carbon nano powders as coating on the surface of polyolefin (Celgard) separators for improving Li metal batteries' performance. However, in these cases the achieved Coulombic efficiency (~80%) is not desirable, even from the early cycles. The low CE % can be attributed to the sluggish transport of Li-ions through the dense layer-by-layer coating formed on the surface of polymer separator. Different approaches, such as nitrogen/sulfur doping and adding CNT spacers have been used to open up channels for easier transport of Li-ions, which adds to the complexity and cost of the method and thus is not commercially viable.

SUMMARY

A high energy density battery is set forth. In an exemplary embodiment, the battery includes a suitable fibrous separator, such as glass fibers available from Whatman, and GO nanosheets operably connected to the fibrous separator's entangled structure. The 3D mechanically stable coating is formed such that dendritic deposition on the battery electrode surface is advantageously suppressed. The GO nanosheets coating can be ultra-thin. The glass-fiber separator can be porous and configured to embed or integrate the thin coating at least partially within the structure thereof.

In a first aspect, an example battery is disclosed. The battery includes (a) a separator that is woven and porous, and (b) a graphene oxide (GO) nanosheet coating coupled to a surface of the separator. The GO nanosheet coating is configured as a buffer layer to permit transport of Li-ions therethrough and to regulate a rate of flow of the transport of the Li-ions.

In a second aspect, an example method to make the battery is disclosed. The method includes (a) applying a coating that includes graphene oxide (GO) nanosheets to at least a portion of a separator, where the separator is woven and porous, and (b) disposing the separator between an anode and a cathode with the coating arranged facing the anode, where the anode comprises a Li-metal.

In another exemplary embodiment, a high energy density battery can include an anode, a cathode, and a separator between the anode and cathode. The separator can be coated to regulate lithium deposition behavior on the electrode surface.

In yet another exemplary embodiment, a high energy density Li-ion battery can include a separator, and graphene oxide nanosheets covering at least a portion of the separator, the graphene oxide nanosheets suppressing dendritic deposition and altering the growth of dendrites during operation to promote dense deposition of lithium.

An exemplary method is set forth. The method of producing batteries configured to promote dense deposition of lithium includes applying a coating containing GO nanosheets to at least a portion of a porous separator, and disposing the separator between an anode and a cathode of the battery. The separator can be formed of any suitable material, such as glass fiber.

In another exemplary embodiment, a high energy density battery can include an anode, a cathode, and a separator arranged between the anode and cathode. The separator can include an ultra-thin coating. The separator can be configured to flex, while retaining needed rigidity of the battery, and to regulate transport of Li-ions to the electrode surface. The coating thickness can be in the range of a few nanometers, to minimize the weight of the resulting structure.

In certain embodiments, a high energy density battery can include a porous separator having an ultra-thin coating applied thereto, the ultra-thin coating for regulating transport of ions to the electrode surface, while promoting dense deposition of the battery metal.

In other embodiments, a high energy density battery can include an anode, a cathode, and a separator between the anode and cathode, the separator including an ultra-thin coating. The separator can be configured to regulate transport of Li-ions to the electrode surface without adding significant dead weight to the battery structure. If desired, the coating can form a three dimensional coating due to the porosity of the separator. Otherwise, a selection of separator material and coating layer(s) can achieve the desired ion transport regulation.

In certain embodiments, the battery can be configured to achieve high current densities in large battery structures.

BRIEF DESCRIPTION OF THE DRAWINGS

FIG. 1A shows an AFM image of exfoliated GO nanosheets showing the thickness of monolayers to be ~1 nm.

FIG. 1B shows Raman spectrum obtained from GO nanosheet coating.

FIG. 1C shows a TEM image of a typical GO monolayer.

FIG. 1D shows an EELS analysis of a GO nanosheet showing the atomic ratio between C and O to be ~3.5. Inset shows the magnified spectrum for the O K-edge peak area.

FIG. 1E shows a schematic of spray coating GO nanosheets and the coating's integration into the woven structure of the separator.

FIG. 1F shows an SEM image of a bare glass-fiber separator. Inset shows an optical image from a typical glass-fiber separator.

FIG. 1G shows an SEM image of a GO-modified separator. Inset shows an optical image from the GO-modified separator.

FIG. 2A shows cycle stability test and morphological evaluation of control and GO-modified samples. Coulombic efficiency (CE) comparison of control and GO-modified Li|Cu half-cells are shown with enhanced cycle life and stability of Li-metal anode up to 160 cycles in case of GO-modified sample.

FIGS. 2B and 2C show corresponding voltage profile of Li-plating/stripping at 1 mA/cm2 for the control and GO-modified samples, respectively. The stripping of Li was limited to 2V.

FIGS. 2D and 2E show SEM images with the magnified profile of the control and GO-modified samples, respectively. FIG. 2D shows the control sample with uneven and dendritic lithium deposition, whereas FIG. 2E shows the GO-modified sample with a uniform Li-deposition without overgrowth of lithium dendrites even after 160 cycles of charge/discharge at 1 mA/cm$^2$ suggesting the improved hysteresis in the case of GO-modified sample.

FIG. 3A shows the voltage-time profile of Li|Li symmetric cell for control and GO-modified samples. The current density was fixed at 1 mA/cm$^2$ with a stripping/plating capacity of 1 mAh/cm$^2$. Insets show magnified voltage profiles of the 40th, 80th, 120th and 160th cycles, respectively.

FIG. 3B shows Nyquist plots of the control cell after 2, 20 and 30 cycles.

FIG. 3C shows Nyquist plots of the GO-modified cell after 2, 20 and 30 cycles.

FIG. 5A shows a schematic of an initial configuration of a lithium deposition mechanism in case of a GO-modified samples.

FIG. 5B shows a schematic of adsorption of Li-ions to the lithiophilic GO nanosheet coating.

FIG. 5C shows a schematic of a random delivery of lithium ions.

FIG. 5D shows a schematic of controlled on-site delivery of Li-ions to the metal anode surface or any other electrode surface.

FIG. 5E shows a schematic of a more uniform lithium deposition resulting from the controlled lithium delivery. Further suppression of Li-dendrites will be obtained by high mechanical stability of the GO nanosheet coating acting as a physical barrier.

FIG. 5F shows a schematic of final uniform lithium deposition to the electrode surface.

DETAILED DESCRIPTION

Figure 4A:
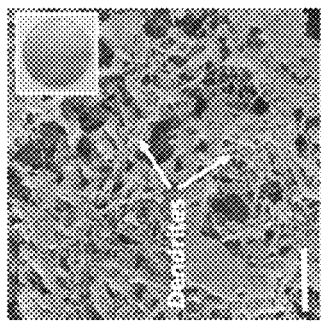
FIG. 4A shows a top view SEM image of dendritic lithium deposition in case of bare copper after 5 cycles with current density (I)=1 mA/cm$^2$ and capacity of (Q)=1 mAh/cm$^2$ in the dissolution state. Inset is optical image from bare Cu-electrode. Inset shows the bare Cu-foil used as a control sample.

This disclosure is directed to exemplary batteries and methods of making and using the batteries. The exemplary batteries and methods advantageously utilize a woven and porous separator having an uneven surface to integrate a graphene oxide (GO) nanosheet coating into the porous surface thereby resulting in a three-dimensional coating. The GO nanosheet coating beneficially permits transport of Li-ions therethrough while regulating the rate of flow of Li-ion transport to a Li-metal anode. The coating is also mechanically stable to suppress Li-dendrites and to provide uniform charge distribution on the electrode surface.

FIG. 1E shows one example configuration of a battery that includes a separator that is woven and porous. In one example implementation, the separator may be a glass-fiber separator.

As shown in FIGS. 5A-5F, the battery also includes a graphene oxide (GO) nanosheet coating 105 coupled to a surface of the separator. The GO nanosheet coating 105 is configured as a buffer layer to permit transport of Li-ions 110 therethrough and to regulate a rate of flow of the transport of the Li-ions 110. The transport of the Li-ions 110 is facile and the regulation of the transport of Li-ions 110 leads to a more uniform lithium deposition that can be further facilitated by the high mechanical stability of GO nanosheet layers in the coating.

In one example implementation, a plurality of gaps 115 exist between a plurality of GO nanosheets 106 in the GO nanosheet coating 105 and configured to permit and regulate the transport of Li-ions 110 therethrough. For example, the gaps 115 permit the Li-ions to move through the GO nanosheet coating between the individual GO nanosheets along an indirect pathway.

In another example implementation, a plurality of GO nanosheets 106 in the GO nanosheet coating have a plurality of defective sites 120 and have negatively charged functional groups on a surface of the plurality of GO nanosheets 106 that each permit and regulate the transport of Li-ions 110 therethrough. For example, the defective sites 120 permit Li-ions to advance through the respective GO nanosheets 106 of the coating 105 along an indirect pathway that impacts the rate of flow of the transport of Li-ions 110 and helps reduce a large influx of Li-ions 110 at a given time. As used herein, "defective sites" refers to inherent structural point vacancies.

In a further example implementation, the GO nanosheet coating 105 may be lithiophilic. In another example implementation, the GO nanosheet coating 105 may have a plurality of GO nanosheets, for example 10 to 1000 GO nanosheets, each having a thickness of 1 nm. In yet another example implementation, the GO nanosheet coating 105 may include a monolayer of GO. And in one example implementation, the GO nanosheet coating 105 may also have a D band/G band intensity ratio of 0.86.

In one optional implementation, the battery may further include an anode 125 and a cathode. And the anode 125 includes Li-metal. In this implementation, the separator is disposed between the anode 125 and the cathode. And the GO nanosheet coating is arranged facing the anode. In a further implementation, the separator, the anode 125, and the cathode are disposed within an electrolyte to permit transport of the Li-ions through the battery.

In a further optional implementation, as shown in FIGS. 5E-5F, the GO nanosheet coating 105 is configured as a physical barrier that suppresses Li-dendritic deposition on the anode and alters growth of Li-dendrites thereby causing uniform deposition of lithium 130 via regulation of the rate of flow of the Li-ion transport through the GO nanosheet coating 105.

Figure 6:
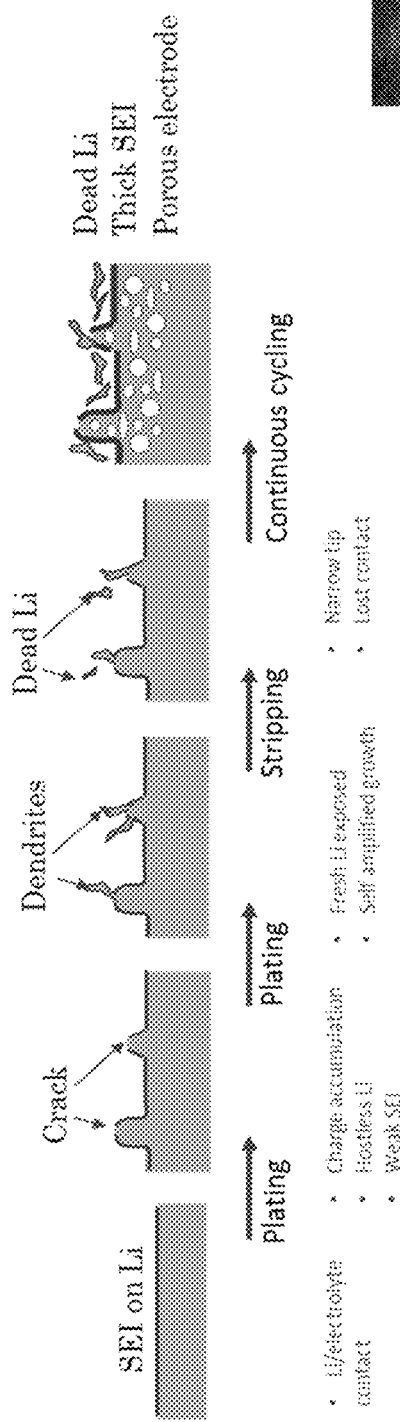
FIG. 6 shows a schematic view of the Li-plating/stripping process, including (i) lithium-electrolyte contact, (ii) charge accumulation, a hostless lithium, and weak SEI, (iii) fresh exposed lithium and self-amplified growth, (iv) narrow tip and lost contact, and (v) dead lithium, thick SEI, and porous electrode.

In one implementation, a plurality of GO nanosheets 106 in the GO nanosheet coating 105 have negatively charged functional groups on a surface of the plurality of GO nanosheets 106 and provide a uniform charge distribution on a surface of separator. For example, the negatively charged functional groups of GO nanosheets attract positive Li-ions and therefore can prevent a rush of Li-ions to the protuberances on the electrode surface, as shown in FIG. 6, leading to a more uniform transport of Li-ions.

In one implementation, the surface of the separator that is coupled to the GO nanosheet coating 105 is uneven or bumpy. The uneven or bumpy surface is the result of the woven and porous structure of the separator. And the GO nanosheet coating 105 is three-dimensional and integrated into the woven and porous separator. This arrangement may beneficially improve the structural integrity of coupling of the GO nanosheet coating with the surface of the separator, as opposed to a coating disposed on a flat substrate separator that may result in separation of the coating from the flat substrate in operation.

In one implementation, the separator and the GO nanosheet coating 105 are configured to flex in response to lithium growth, to suppress Li-dendrite growth, and to retain an operating rigidity of the battery. In other words, the GO nanosheet coating acts as a physical barrier against lithium growth as shown in FIGS. 5E-5F.

Figure 18:
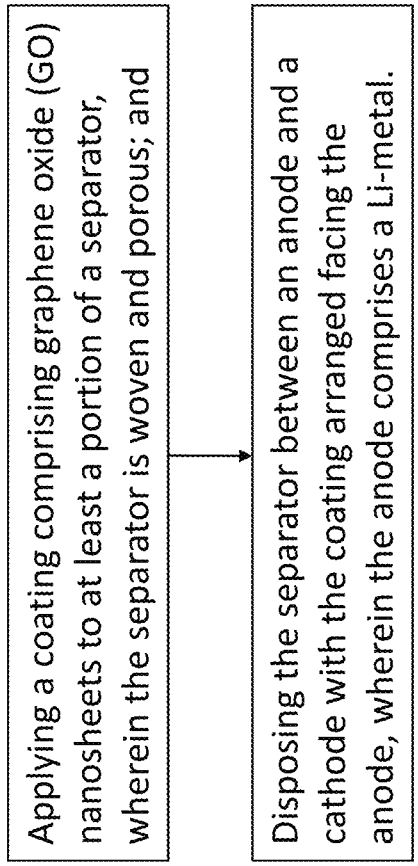
FIG. 18 is a flow chart of a method according to one example implementation.

Method 200 in FIG. 18 shows an embodiment of a method that can be implemented to make or use one or more implementations of the battery disclosed above. Method 200 includes one or more operations, functions or actions as illustrated by one or more blocks of 205 and 210. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Method 200 includes applying a coating that includes graphene oxide (GO) nanosheets to at least a portion of a separator, as shown at block 205. The separator is woven and porous. Next, the separator is disposed between an anode and a cathode with the coating arranged facing the anode, as shown at block 210. And the anode includes a Li-metal.

In one implementation, method 200 includes, prior to disposing the separator between the anode and the cathode, evaporating a solution from the coating comprising the GO nanosheets at room temperature at least 24 hours. Then, after evaporating the solution from the coating that includes the GO nanosheets, the separator is transferred to a chamber, for example in an argon glove box, under heating and vacuum at a temperature of approximately 70° C. for at least 24 hours.

In one implementation, applying the coating that includes the GO nanosheets to at least the portion of the separator includes spray coating, via a spray coating gun, 0.1 mg/cm$^2$ mass loading of GO nanosheets dispersed in NMP/PVDF (9/1) solution.

In one implementation, the GO nanosheet coating is lithiophilic. In this implementation, the method further includes adsorbing Li-ions to a surface of the GO nanosheet coating. Then, Li-ions are transported through a plurality of gaps that exist between a plurality of GO nanosheets in the GO nanosheet coating and through a plurality of defective sites within the plurality of GO nanosheets, thereby regulating a rate of flow of the Li-ion transport to the anode.

In one implementation, Li-dendritic deposition on the anode is suppressed via the GO nanosheet-coated separator that acts as a physical barrier, thereby altering growth of Li-dendrites and causing dense uniform deposition of lithium on the anode.

In another implementation, in response to lithium growth on the anode, the GO nanosheet-coated separator flexes and retains an operating rigidity of the separator, thereby suppressing Li-dendrite growth.

In a further implementation, a uniform charge distribution is provided on the GO nanosheet-coated separator via negatively charged functional groups on a surface of a plurality of GO nanosheets in the coating.

Example

Dendritic growth of lithium (Li) has severely impeded the practical application of Li-metal to battery structures. In accordance with the principles of the present disclosure, a suitable 3D-conformal graphene oxide (GO) nanosheet coating, integrated into the woven structure of a porous separator, such as a glass-fiber separator, permits facile transport of Li-ions through the structure of the porous separator, meanwhile regulating the lithium deposition. For structures configured in accordance with the present disclosure, electrochemical measurements illustrate a remarkably enhanced cycle life and stability of Li-metal anode, which is confirmed by various microscopy and modeling results. Utilizing Scanning Electron Microscopy (SEM), Focused Ion Beam (FIB) and optical imaging, formation of uniform Li-film on the electrode surface for GO-modified samples can be examined.

In accordance with the present disclosure, two-dimensional materials can be employed for regulating the lithium deposition.

Lithium metal is the ideal anode material owing to its large theoretical capacity (3860 mAh/g) and low redox potential (~3.04 V vs standard hydrogen potential, $H_2/H^+$). However, safety hazards due to lithium's infinite relative volume change and high reactivity, led to suspension of Li-metal batteries (LMB) soon after their commercialization four decades ago. Specifically, the poor cycle life and safety hazards are due to the dendritic lithium deposition around the protuberances of the electrode surface with enhanced electric field. Meanwhile, the solid electrolyte interphase (SEI) formed at the lithium/electrolyte interface is not mechanically stable enough to accommodate the high volume changes of the Li-anode during the Li-plating/stripping process and can easily break.

This results in further formation of Li-dendrites and consumption of fresh lithium and electrolyte. During prolonged cycling, the Li-dendrites with narrow roots can easily detach from the current collector thereby forming electrochemically inactive Li-agglomerates (dead lithium). And, under extreme circumstances, Li-dendrites can cause internal short circuit between the electrodes. Eventually the above-mentioned structural evolution leads to rapid capacity decay and catastrophic failure of the battery, as shown in FIG. 6. Therefore, creating uniform Li-ion flux on the anode surface and high mechanical stability at the electrolyte/solid lithium interface are critical approaches towards regulation of Li-metal anode and its commercialization.

In accordance with the present disclosure, structures are provided to prevent the uncontrolled lithium deposition using a light, cost-effective and scalable coating. This coating permits Li-ion transport. The coating is also mechanically stable to suppress Li-dendrites and provide uniform charge distribution on the electrode surface. Carbon materials have physical and mechanical properties that may hinder the dendritic deposition of Li-metal anodes. In this context, the cycling stability and uniformity of lithium deposition may be improved by utilizing different forms of carbon materials. For instance, carbon nano-tubes (CNTs), carbon spheres, Li/C composites, C-wood template, doped carbon and nano-diamond are examples of suitable coating materials to regulate the Li-metal deposition through different mechanisms, such as a guiding matrix, 3D-Li host or artificial solid electrolyte interphase ("SEI").

Nevertheless, doctor blading of carbon materials on separator/electrode surface or rGO/wood scaffolds add a significant percentage of inactive weight material (0.5-3 mg/cm') to the system and lower the specific capacity. On the other hand, other design using complex carbon materials like CNT, carbon nano-sphere, nano-diamonds or CVD grown graphene require high processing cost and face scalability hurdles. Therefore, the present disclosure provides an effective method of using 2D carbon materials, which is scalable, reproducible, cost-effective, and does not add a significant weight of inactive material to the battery.

In accordance with the present disclosure, a coating, such as graphene oxide (GO) nanosheets, can be spray-coated on the surface of a glass-fiber (GF) separator and can be widely used to stabilize the surface of the Li-metal anodes due to the coating's ease of synthesis, lithiophilicity, ultrahigh mechanical strength (Young's modulus approaching 300 GPa), superflexibility (bending modulus approaching 1 kT), defective structure and electrically insulating nature. To overcome the known complexities, a facile spray coating of mono-layer GO nano-flakes may be deposited on the surface of a glass-fiber separator, which results in a 3D conformal coating, integrated into the woven structure of glass fiber is set forth. Designs constructed in accordance with the present disclosure improve transport of Li-ions through separator structure, while delaying the transport of a large flux of Li-ions to the anode surface. This significantly regulates the lithium deposition and improves the cycling stability of Li-metal anode. Utilizing a combination of electrochemical and microscopy characterization techniques, such as scanning electron microscopy (SEM), focused ion beam (FIB) and optical imaging, the lithium structural evolution can be monitored upon deposition.

The results from the methods and apparatus of the present disclosure indicate that the presence of GO nanosheets on the anode/separator interface induces a more uniform lithium deposition. The improvement in uniformity of lithium deposition is due to 1) the existence of defect sites and negatively charged functional groups on the surface of defective GO layers, and 2) high mechanical stability of 2D GO layers that are integrated into the woven texture of glass-fiber separator.

GO nanosheets were successfully synthesized using the modified Hummers method. FIG. 1A displays the AFM image of the GO nanosheets with thickness of ~1 nm and confirms the complete exfoliation of GO down to monolayers. This value is higher than the known thickness of pristine graphene (~0.34 nm). The increased thickness is due to the presence of covalently bound oxygen and the formation of the $sp^3$-hybridized carbon atoms above and below the graphene plane. Raman spectroscopy in FIG. 1B obtained from the GO nanosheet shows the presence of disorder band (D band) and in-phase vibration of the graphite lattice band (G band) around 1355 $cm^{-1}$ and 1600 $cm^{-1}$, respectively, with the D/G band intensity ratio to be 0.86 confirming the GO characteristics.

Figure 7:
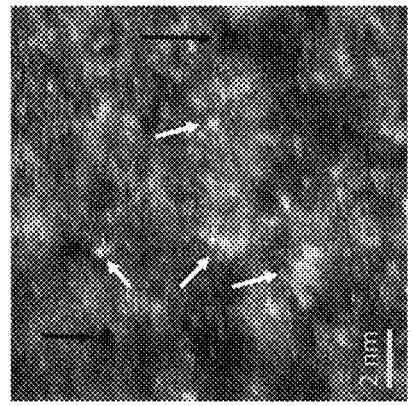
FIG. 7 shows a HAADF STEM image of GO nanosheets showing oxygen content (e.g., white arrows) and intrinsic GO defect sites (e.g., black arrows).
Figure 8:
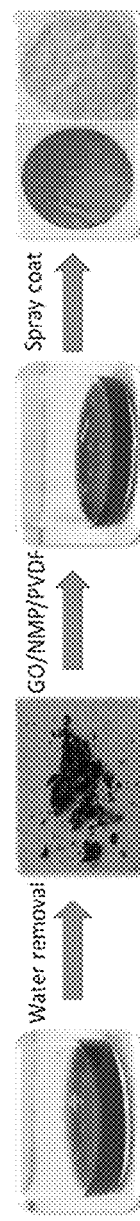
FIG. 8 shows a schematic of a surface coating process using a spray coating technique.

FIG. 1C shows a low magnification scanning transmission electron microscopy (STEM) image obtained from a typical exfoliated flake. Utilizing electron energy loss spectroscopy (EELS) the ratio of carbon to oxygen (C/O) was quantified to be ~3.5 in the structure (FIG. 1D). Additionally, a high magnification high angle annular dark field (HAADF)-STEM image (FIG. 7) obtained from GO confirms the existence of both oxygen atoms and the inherent GO defect sites. The spray coating technique was utilized to coat ~0.1 mg/cm$^2$ mass loading of GO nanosheets dispersed in NMP/PVDF (9/1) solution (FIG. 8) on a glass-fiber separator (FIG. 1E), and vacuum dried the coated separator to remove the remaining residues. FIGS. 1F and G show the SEM and optical images obtained from a typical glass-fiber separator and a GO-modified one. As shown, GO nanosheets are well integrated into the woven structure of the glass-fiber separator, creating strong links between the GO nanosheets.

Figure 9A:
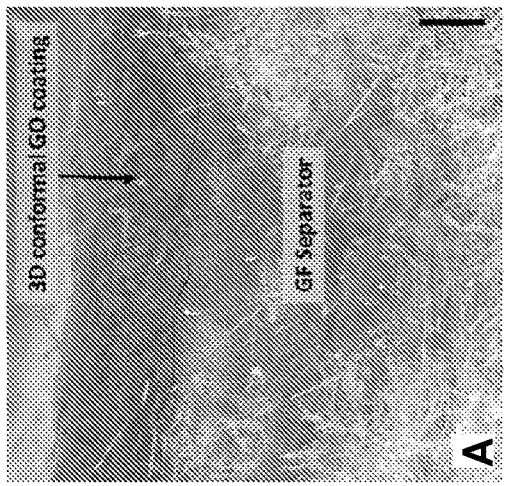
FIG. 9A is a cross-section SEM image for a GO coating on the glass-fiber separator that shows interconnection of the GO nanosheet with the woven structure of the glass-fiber. The scale bar is 20 μm.
Figure 9B:
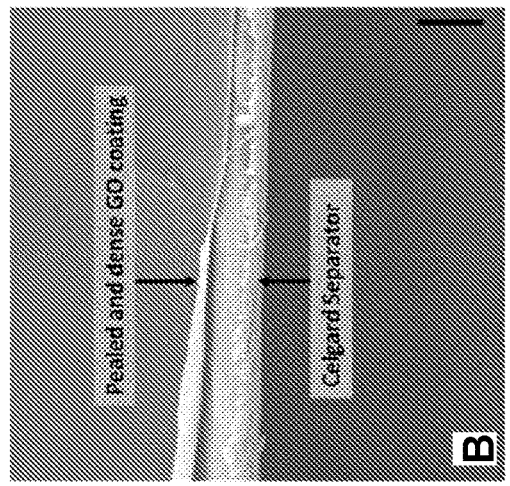
FIG. 9B shows a cross-section SEM image for a GO coating on the surface of a Celgard separator that shows un-integrity and delamination of the coating at the edges. The scale bar is 20 μm.

Glass-fiber with high wettability and woven structure is an example candidate that may be used as a stable host for 2D materials. Glass-fiber permits confinement or integration of GO nanosheets into the glass-fiber structure. At the same time, glass-fiber prevents the high-stacking of GO nanosheets and formation of dense coating on the glass-fiber surface. Cross section imaging performed on a GO-coated glass-fiber separator (shown in FIG. 9A) reveals the formation of a 3D-conformal coating, advancing towards the core of the separator, with more spacing between the GO nanosheets, which allows for facile transport of Li-ions. However, in the case of polymer separators, such as Celgard, the GO nanosheet forms a highly dense coating with low adhesion to the separator that can easily delaminate from the surface of the separator and enter the electrolyte during cycling (shown in FIG. 9B).

To test the cycle stability of lithium deposition/dissolution, Cu Li half-cells with bare and GO-modified glass-fiber separators were used. Copper foil, a general control sample in the Li-metal anodes research was used as the working electrode, Li-metal as the counter/reference electrode and 1 M Lithium hexafluorophosphate (LiPF$_6$) dissolved in (1:1 v/v) ethylene carbonate/dimethyl carbonate (EC/DMC) as the electrolyte. Lithium was electrochemically deposited from the Li-metal counter-electrode onto the Cu-working electrode and then stripped away. The current density was set at the practical amount of (I)=1 mA/cm$^2$ to achieve a constant charge capacity of (Q)=1 mAh/cm$^2$. Coulombic efficiency (CE), defined as the ratio of Li-stripping capacity to Li-plating capacity at each cycle, is an important factor in Li-metal-based batteries as CE directly shows the Li-metal deposition behavior and charge/discharge cycle ability. The Coulombic efficiency of control cells and GO-modified cells are plotted as a function of cycle number in FIG. 2A. Considering the excess amount of electrolyte (200 μl) that was used in the cell assembly, capacity fading is directly related to the Li-metal deposition.

As the Li-metal counter-electrode has excessive lithium, the Coulombic efficiency in this case reflects the damage in the working electrode that originates from the highly resistive porous Li-layer formed as a result of dead lithium and SEI-shell residue accumulation upon continuous cycling. As evidenced in FIG. 2A, the capacity retention of the GO-modified sample is significantly improved compared with the control sample. The control sample capacity faded to under 80% after ~80 cycles and faded to under 20% CE after 115 cycles. However, the capacity of GO-modified sample faded to only 83% after 160 cycles.

The result demonstrates ~100% improvement in the cyclability of Li-metal compared to the best control sample working for 80 cycles. Also, the limited stability of the 1 M LiPF$_6$/EC/DMC electrolyte is partially responsible for this fading. The CE of the first cycle for the GO-coated sample was 63%, whereas for the control sample, CE was 83%. Recent DFT calculations show that the Li-ion diffusion barrier can dramatically reduce after initial lithiation of 2D-materials protective layer. Thus, the lower CE observed in the first cycle of the GO-modified sample can be attributed to the energy barrier that Li-ions need to overcome before establishing their pathway in the GO nanosheet coating.

The voltage profiles of lithium deposition/dissolution at the 20$^{th}$, 60$^{th}$, 100$^{th}$ and 117$^{th}$ cycles are displayed in FIGS. 2B and 2C for the control and GO-modified samples, respectively. The discharging voltage profiles of the control sample are clearly shorter compared to the GO-modified sample indicating the larger amount of irreversible capacity loss. The hysteresis of the 20$^{th}$ cycle for both cases is about 75 mV (versus Li/Li$^+$) which increases to 129 mV for the control sample and to only 86 mV for the GO-modified sample at the 100$^{th}$ cycle just before the fast failure of the control sample.

In order to visually compare the lithium deposition behavior in case of control and GO-modified samples, the Cu Li half-cells were disassembled after the Coulombic efficiency test, and SEM imaging was performed on the Cu-counter electrodes. As expected in the case of the control sample, uneven and dendritic lithium deposition was clearly visible. Interestingly, in case of the GO-modified sample, a more uniform lithium deposition was observed without overgrowth of Li-dendrites even after 160 cycles of charge/discharge at 1 mA/cm$^2$, showing the effective role of GO nanosheet coating on regulation of the lithium deposition.

Figure 10:
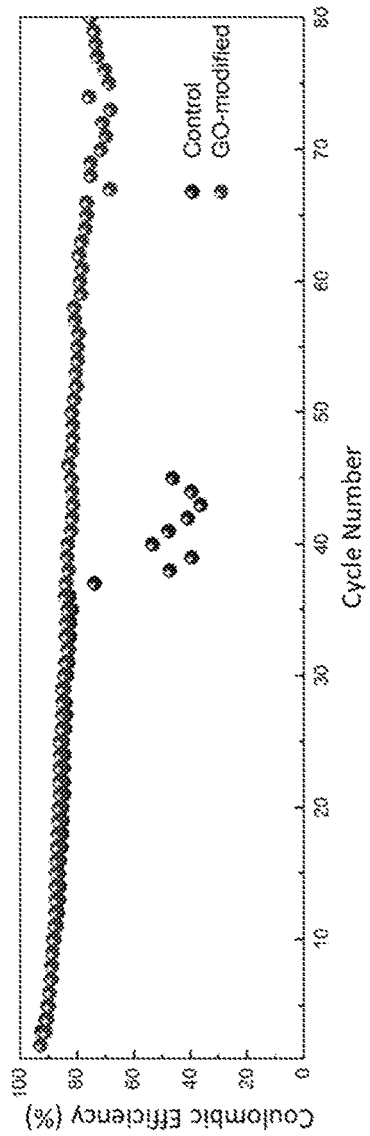
FIG. 10 shows a Coulombic efficiency (CE) comparison of control and GO-modified Li|Cu half-cells showing an enhanced cycle life and stability of a Li-metal anode up to 80 cycles in the case of GO-modified sample. Li plating/stripping was performed at 2 mA/cm$^2$ with capacity of 1 mAh/cm$^2$ for the control and GO-modified samples, respectively.

Cycling tests were also performed at higher current density of (I)=2 mA/cm$^2$ for a constant charge capacity of (Q)=1 mAh/cm$^2$. As shown in FIG. 10, the CE % of the control sample dropped to under 80% after only 40 cycles. However, the GO-modified sample remained highly stable for up to 80 cycles. Similar to the case with lower current density of (I)=1 mA/cm$^2$, the cycle stability of the GO-modified sample is improved ~100%, which shows the significance of the methods and battery apparatus of the present disclosure.

Figure 11:
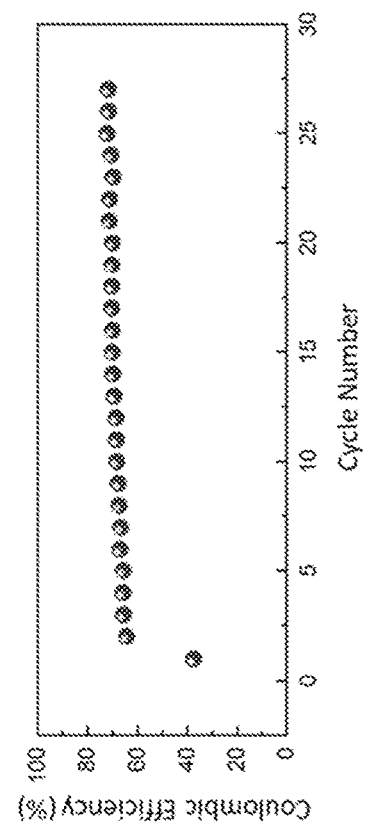
FIG. 11 shows an electrochemical cycling test performed on a GO nanosheet coated Celgard separator at current density of 1 mA/cm$^2$ and capacity of 1 mAh/cm$^2$, showing low Coulombic efficiency (CE) of ~70% for ~30 cycles.

In order to compare the effect of separator choice in improving the cyclability of the cells, the surface of Celgard polymer separator was coated with GO nanosheets, as well. As shown in FIG. 11, the CE % of the Li Cu half cells with GO nanosheet coated Celgard separator shows constant CE % of only 70% for up to 30 cycles at current density of 1 mA/cm$^2$ and capacity of 1 mAh/cm$^2$, which is much lower than the case using glass-fiber separator (>90%). As known in the art, the dense coating formed on the surface of a polymer separator makes the transport of Li-ions sluggish, leading to lower CE % even from early cycles.

In order to evaluate how anode over-potential changes during repeated cycling, Li|Li symmetric cells were employed. The interfacial stability and charge transfer behavior were investigated by voltage-time profile (A) in case of control and GO-modified samples at current density of (I)=1 mA/cm$^2$ and stripping/plating capacity of 1 mAh/cm$^2$. Notably, the over-potential in the control sample starts to increase soon after 40 cycles. This increase can be attributed to the non-uniform deposition of lithium, which leads to formation of dead lithium particles and regrowth of SEI into a thicker layer. However, in the case of the GO-modified sample the voltage profile remains almost constant (~50 mV) for over 160 cycles, exhibiting a more uniform lithium deposition and a more stable interface. Magnified profiles for 40$^{th}$, 80$^{th}$, 120$^{th}$ and 160$^{th}$ cycles are shown in the inset.

To further clarify the function of GO nanosheet coating, electrochemical impedance spectroscopy (EIS), a reliable tool in providing information about SEI, was performed on the control and GO-modified samples after 2, 20 and 30 cycles. The diameter of the partial semicircles at high frequencies, shown in FIGS. 3B and 3C, represents the charge transfer resistance ($R_{ct}$) at the interface between electrode and electrolyte. As shown in FIG. 3B, the impedances in the control sample fluctuated largely, ranging between ~170 and ~250 ohms. The observed large impedances, suggest the continuous formation of resistive SEI induced by Li-dendrites. In contrast, the GO-modified sample shows a much smaller impedance of ~70 ohms for all 2, 20 and 30 cycles (FIG. 3C). These highly overlapping and consistent EIS spectra demonstrate the effective role of the GO nanosheet coating in stabilizing the SEI and controlling the lithium deposition behavior. In addition, as shown in the inset of FIGS. 3B-C, the electrolyte resistance for the control sample increases from ~5 to ~10 ohms after 30 cycles. However, in case of the GO-modified sample, a highly stable electrolyte resistance of ~5 ohms was observed even after 30 cycles. This observation also confirmed the formation of stable SEI and uniform Li-film on the electrode surface, with less fresh lithium exposed to electrolyte.

Figure 12:
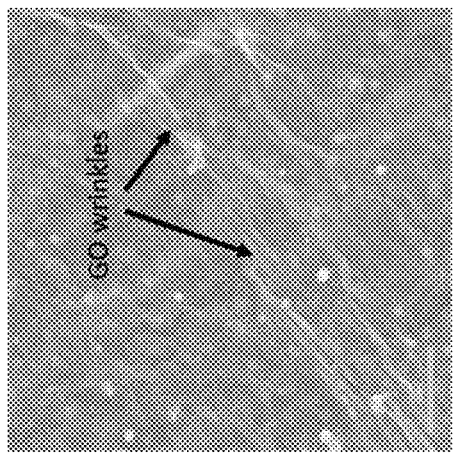
FIG. 12 shows the surface of Cu-foil coated with GO nanosheets. Wrinkles confirm the existence of GO flexible nanosheets on the surface. The scale bar is 2 μm.
Figure 13:
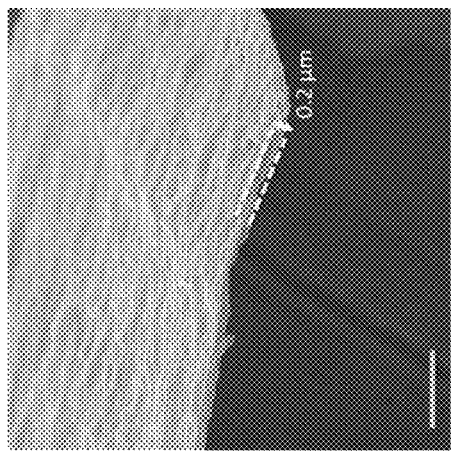
FIG. 13 shows the thickness of the GO coating on the Cu surface. The scale bar is 1 μm.

To consider the deposition mechanism of lithium in the presence of GO nanosheets and to confirm the diffusion of Li-ions through the GO nanosheet coating, Cu Li half-cells were employed with GO nanosheet spray coated on the Cu-foil instead of on the separator. FIG. 12 shows the wrinkles on the copper surface, which confirms the existence of GO nanosheet on the copper surface. Thickness of the coating was measured to be ~0.2 μm (FIG. 13) with a mass loading of ~50 μg/cm$^2$. The Cu Li half-cells were cycled for five times to electrochemically deposit and strip away Li-metal onto the Cu-foil with current density of (I)=1 mA/cm$^2$ and capacity of (Q)=1 mAh/cm$^2$.

Figure 14:
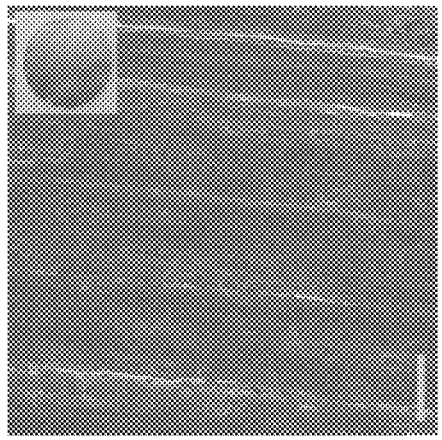
FIG. 14 shows SEM and optical images of bare Cu-foil showing rough surface morphology. The scale bar is 2 μm.

Ex-situ SEM observations were carried out on bare and GO-modified Cu-working electrodes in the dissolution state. Expectedly, extensive Li-dendrites were observed on the surface of bare copper electrode (FIG. 4A). This is attributed to the self-amplification of the initial lithium deposition on the pre-existing protuberant tips of the metal surface (FIG. 14), which unescapably occur during the lithium electrodeposition process. Specifically, due to the large electric field intensity near the protuberances, current density will be larger and a great amount of free Li-ions get adsorbed on the tips, commonly known as the "tip effect".

Figure 4B:
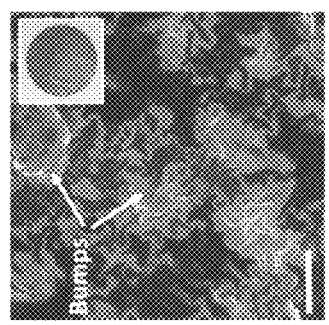
FIG. 4B shows a top view SEM image of the bulged GO nanosheet coating in case of the GO-modified electrode after 5 cycles with current density (I)=1 mA/cm$^2$ and capacity of (Q)=1 mAh/cm$^2$ in the dissolution state. Inset is an optical image from GO-modified Cu-electrode.
Figure 15:
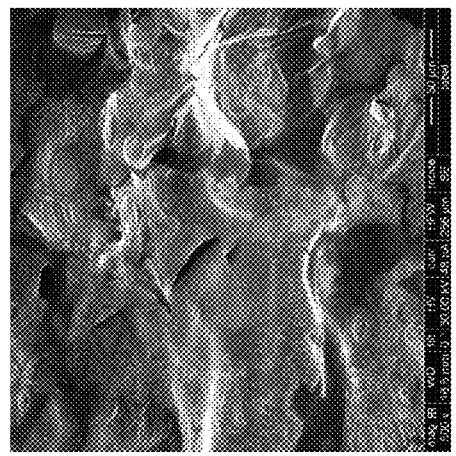
FIG. 15 shows a 30° angled view SEM image of a Cu-GO sample after 5 cycles with current density of 1 mA/cm$^2$ and capacity of 1 mAh/cm$^2$ showing no Li-dendrites, but a bumpy GO surface resulted from the lithium deposition underneath the coating.

The tip effect phenomena expedites the nucleation and growth of Li-metal locally, which eventually evolves into Li-dendrites. As shown in FIG. 4B, no dendrites and a bulged surface were observed in the case of GO nanosheet-coated Cu-foil. To better illustrate the bumpy topography, low-magnification angled-view SEM image from GO-modified copper surface after cycling is shown in FIG. 15. Considering the electrically non-conductive nature of GO, this observation was expected as the Li-ions do not tend to deposit on an insulating surface, where considerable amount of electrons for reduction of Li-ions to Li-metal are not accessible. Meanwhile, it has been shown that the existing gaps between the GO nanosheets, inherent defective sites of GO together with the negatively charged and lithiophilic ion-hopping spots, can all permit the small ions like Li-ions to pass through the GO nanosheet membrane.

Figure 16:
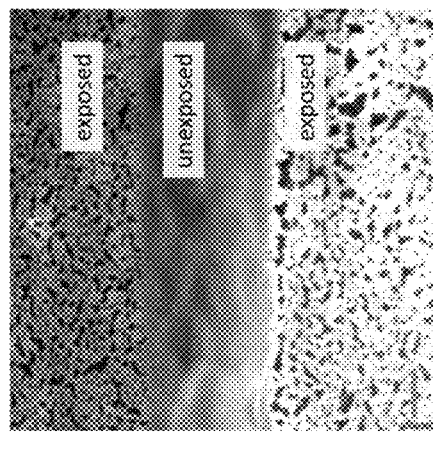
FIG. 16 shows exposed and unexposed areas by ion beam. Upon removal of the GO nanosheet coating, the deposited lithium underneath is obvious. The scale bar is 4 μm.
Figure 17:
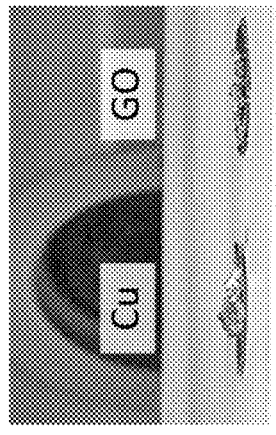
FIG. 17 shows a lithiophilicity test on bare and GO nanosheet coated copper. The lithiophilicity test performed on bare copper (left) and GO nanosheet coated copper (right) shows a smaller contact angle and improved wettability in the case of the GO coated sample. The scale bar is 1 cm.

Considering the points mentioned, GO nanosheet coating only acts as a buffer layer for regulation of Li-metal deposition on the anode surface. By acquiring high magnification SEM images and exposing the GO-modified sample to higher electron beam dose, beam-driven activity of deposited lithium under the GO nanosheet coating was observed. The reaction of deposited Li-metal under the beam exposure results in the slight development of surface bumps. Focused ion beam (FIB) was then used to remove the GO nanosheet coating from the surface of the cycled copper electrode to directly image the deposited Li-metal film right below the GO nanosheet coating. As shown in FIG. 16, a smooth lithium deposition is formed underneath the GO nanosheet coating. A portion of the defined area was left unexposed (middle), to further confirm the existence of the bumpy GO nanosheet coating on the Li-metal deposits.

Figure 4C:
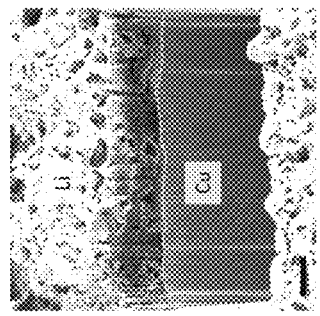
FIG. 4C shows a FIB/SEM cross-section imaging of biased Cu-electrode, showing a non-uniform and dendritic lithium deposition.

Further SEM/FIB cross section imaging was performed to evaluate the morphology of the lithium deposition at the Li/Cu interface. FIG. 4C shows the cross-section image of a typical non-uniform and textured lithium deposition on the bare copper electrode. The hollow spaces between the copper surface and deposited lithium, shown in FIG. 4D, are generated by non-uniform and local lithium deposition. These hollow spaces between the copper surface and deposited lithium can isolate the newly deposited lithium from the conductive copper current collector, rendering the lithium deposits electrochemically inactive (i.e., dead lithium).

Figure 4E:
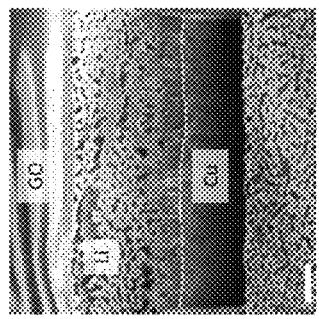
FIG. 4E shows distinctly more uniform and dense lithium deposition on the surface of copper observed in the GO-modified sample. Graphene wrinkles in the top evidence the presence of the GO nanosheet coating.
Figure 4D:
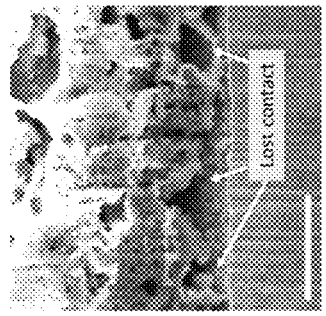
FIG. 4D shows a high magnification image from FIG. 4C revealing inhomogeneous lithium deposition and holes generated at the Cu—Li interface.
Figure 4F:
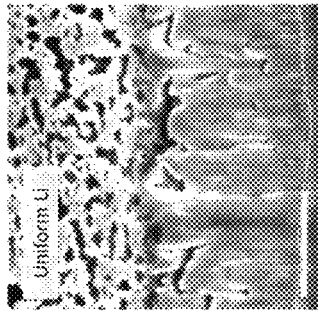
FIG. 4F shows a high magnification image from FIG. 4E showing a dense and well-connected deposited Li-layer.

However, in the case of the GO-modified sample, a highly uniform lithium deposition was observed with no lost contact to the copper current collector (FIG. 4E). Graphene wrinkles observed in the upper side of the image evidence the presence of the GO nanosheet coating that is partially removed upon the ion beam exposure. The well-connected Li-film shown in FIG. 4F renders a more electrochemically-active lithium layer and can extend the lithium utilization upon cycling, resulting in the improved battery performance observed. This blended Li/Cu interface emphasizes that the GO nanosheet coating can effectively suppress any governing and local lithium overgrowth even from the initial steps of the cycling. This observation confirmed that GO nanosheet coating is not only a strong barrier to mechanically suppress the Li-dendrites, but other mechanisms may also be involved in initiating the uniform plating of lithium.

Figure 4G:
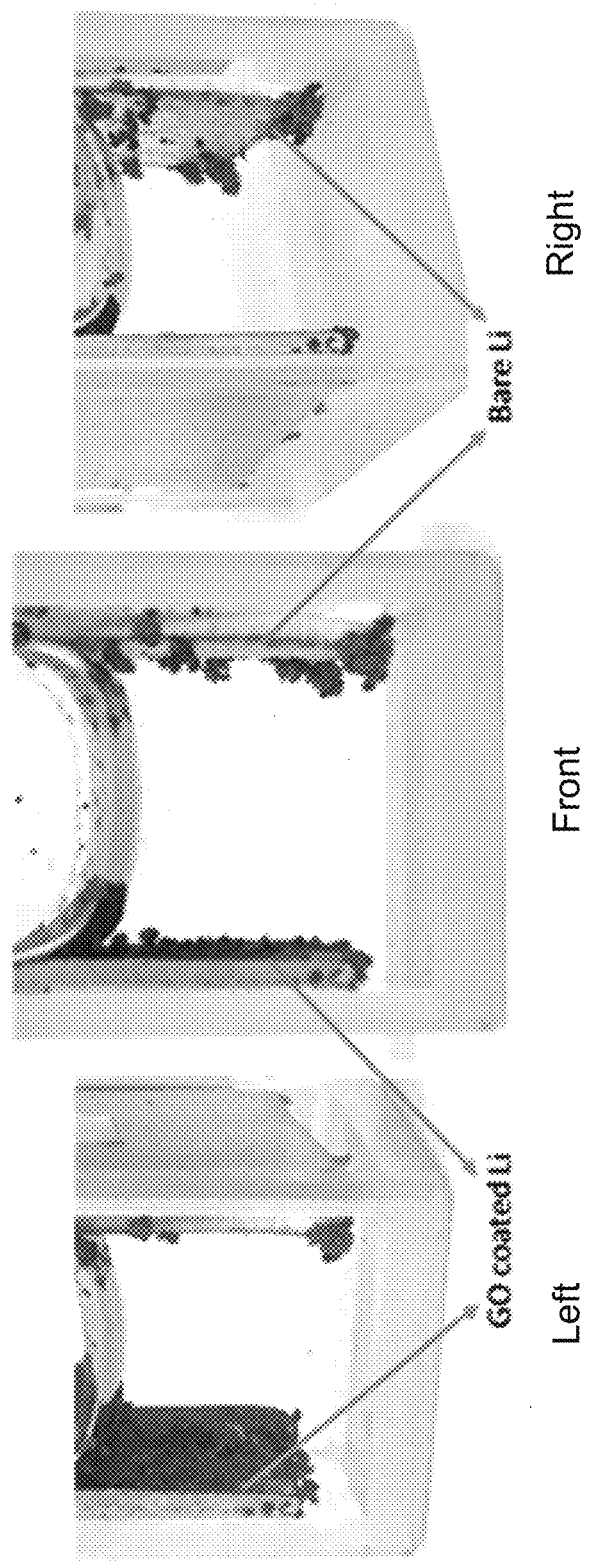
FIG. 4G is optical imaging showing a more uniform deposition of lithium on the GO-modified side (left) compared to the local and dendritic lithium deposition on the bare Li (right) after 2 cycles with current density (I)=5 mA/cm$^2$ and capacity of (Q)=5 mAh/cm$^2$. The scale bars are 3 μm.

In addition, a symmetric Li-GO Li quartz cell was used to illustrate the effective role of GO nanosheet coating on the lithium deposition in-operando and in large scale, while deconvoluting the effect of separator pressure applied in the coin cell assembly. Optical imaging was performed on the quartz cell under cycling (current density (I)=5 mA/cm$^2$, capacity (Q)=5 mAh/cm$^2$). FIG. 4G shows the optical images taken from the front and side views of the cycled cell. A more uniform and dispersed lithium deposition was observed in the case of GO-modified lithium sample (left) compared to the bare lithium sample (right), where growth of Li-dendrites was locally amplified. In this setting, in contrast to the GO glass-fiber sample, the GO nanosheets are loosely bonded to the Li-metal surface. The GO nanosheets can also dislocate easily during the lithium deposition/dissolution and eventually provide Li-dendrites a passage through the gap sites generated between the GO nanosheets.

The lithiophilicity of the GO nanosheet coating was confirmed experimentally by showing the increased contact angle of molten lithium to the GO nanosheet coated copper compared to a bare sample (FIG. 16).

Lithiated 2D materials with single vacancy (e.g. graphene, phosphorene, and silicene) can dramatically lower the diffusion barrier of Li-ions from 3.60 eV to 1.98 eV. Accordingly, spray-coated GO nanosheets on the glass-fiber separator of the present disclosure a beneficially provide an effective protective coating due to the presence of a high number of intrinsic defect sites in GO and the 3D integration of GO nanosheets with the woven structure of glass-fiber separator that allows for facile transport of Li-ions, while regulating the lithium deposition.

In summary, based on microscopy observations, the present disclosure provides the mechanism for uniform lithium deposition in the case of GO-modified samples. In the presence of a GO barrier layer, despite the typical lithium plating, randomly distributed lithiophilic GO nanosheets will first adsorb a considerable amount of the free Li-ions in the electrolyte to their surface (FIGS. 5A and 5B). In this situation, the GO layer binds with Li-ions and hinders the electrostatic interactions between Li-ions and copper surface protuberances, delaying the Li-ions' rush to the metal surface. Then, considering the electrically insulating nature of GO and high number of defect sites existing in the new 3D GO nanosheet conformal coating, the GO nanosheet layer will only act as a buffer layer and Li-ions will pass through the defect sites and deposit on the metallic surface of the working electrode (FIGS. 5C and 5D), based on the knock-off mechanism. This random and homogeneous delivery of Li-ions through GO intrinsic defects and the space existing between the nanosheets, terminates the "tip effect" and results in a more uniform lithium deposition. Eventually, the high mechanical stability and superflexibility of GO nanosheets act as a physical barrier and further suppresses the Li-dendrites (FIGS. 5E and 5F).

In accordance with the present disclosure, a facile, scalable and low cost design can be used as a surface modification approach in Li-metal battery application. This approach employs spray coating of GO nanosheets on the glass fiber separator membrane, leading to a highly constrained and defective 3D buffer layer for regulation of Li-metal deposition. The electrochemical tests show significant improvement in the cyclability and stability of Li-metal in case of GO-modified samples. Through SEM and optical observations, a dense and uniform deposition of lithium was demonstrated to be achieved by the presence of GO nanosheets on the surface of the electrode.

Importantly, the method of the present disclosure is highly scalable and economically feasible. The design of the present disclosure advantageously provides two-dimensional materials for controlling the random behavior of Li-dendrites and improves viability of the next generation of safe and rechargeable Li-metal batteries.

In an example embodiment, Graphene Oxide (GO) was prepared using a modified Hummers method. Typically, 30 g $H_2SO_4$ and 4 g graphite were stirred for 2 hours in a beaker in an ice bath. Then 3 g $KMnO_4$ was added and the graphite oxidized overnight at room temperature. Then a specific amount of water was slowly added into the mixture and the temperature was increased to 95° C. After that 30 mL mixture of hydrogen peroxide (30%) and water (1:5, vol) was added and the product was washed by 5 wt % hydrogen chloride in deionized water. The obtained product was re-suspended in water, and the brown-yellow colloid was sonicated in water (300 W, 50% amplitude) for 60 minutes and centrifuged at 5000 rpm for 15 minutes. The sediments were discarded and monolayers of GO in aqueous solution was obtained. Electrolyte with composition of 1 M $LiPF_6$ dissolved in (1:1 v/v) ethylene carbonate (EC):dimethyl carbonate (DMC) from Sigma Aldrich was used in electrochemical cells. Lithium anode used in this study was in the form of Li chips (99.9%) with dimensions of 15.6 mm in diameter and 0.45 mm in thickness purchased from MTI. Whatman glass-fiber membranes were used as separator membranes.

GO nanosheets using modified Hummer's method were initially dispersed in water solution. However, in order to obtain a more viscose and water-free GO solution to be used as stable coating, the GO nanosheets were re-dispersed in NMP/PVDF (9/1). The method used for preparation of the GO nanosheets/NMP/PVDF solution can be seen in FIG. 8. Water-dispersed graphene oxide nano-flakes were heated at 110° C. to evaporate the water and were dried in a vacuum oven at 80° C. for 2 hours to remove all the remaining residual water.

The obtained GO powder was then dispersed in N-Methyl-2-pyrrolidone (NMP)/Polyvinylidene fluoride (PVDF) under sonication with a GO/PVDF mass ratio of 9:1 to obtain a more viscose water-free solution. As prepared, the GO/PVDF/NMP suspension was spray-coated on the glass-fiber separator, Celgard separator, copper foil, Li-metal for further experiments. Coated substrates were dried in a vacuum oven at 60° C. overnight before cell assembly.

Lithium deposition: Lithium was deposited on copper foil substrates of 15.6 mm in diameter at the desired current densities using a Bio-Logic VMP3 Potentiostat, in a 2032 coin cell battery containing 1 M Lithium hexafluorophosphate ($LiPF_6$) dissolved in (1:1 v/v) ethylene carbonate/dimethyl carbonate (EC/DMC).

For the Cu|Li cell construction, 20 μm-thick Cu-foil was used as the working electrode, and a 450 μm-thick Li-disc was used as the counter and reference electrodes. Cells containing the electrodes, separator and electrolyte were assembled in an argon-filled glove box. To exclude the electrolyte depletion effect, an excess amount of the electrolyte (200 μl) was used.

For the Li|Li symmetric cell test, 2032 coin-type cells were constructed with the same configuration, excluding the substitution of the working electrode with the Li-electrode. No pre-formation step was performed on the cells prior to the cycling.

Cycling and EIS tests were carried out in Bio-Logic VMP3 Electrochemical Workstation equipped with EC-Lab software. Cu|Li cells were used for cycling and EIS measurement and lithium was deposited at a constant current density of 1 and 2 $mA/cm^{-2}$ with the capacity of 1 $mAh/cm^{-2}$ onto the Cu-electrode, followed by lithium dissolution up to 2V. Pre-cycling was performed on the cells being cycled at 2 $mA/cm^{-2}$. EIS measurements were performed at a frequency ranging from 100 kHz to 100 mHz after 2, 20 and 30 cycles.

FEI Helios Nanolab 600 dual-beam FIB/SEM was used for FIB cross-section imaging. In order to remove the GO nanosheet coating for better observation of lithium deposition underneath the coating, 30 kV Ga-ion beam was used to scan a 512*512 pixel image with 300 ms dwell time. Ion beam can successfully remove the GO nanosheet coating without considerable damage to the Li-metal surface. Cross section imaging was also performed using 30 kV Ga-ion beam and then the surface was further cleaned using 5 kV ion beam to eliminate curtain effect.

The GO nanosheet coated Li-foil together with another bare Li-foil and copper current collectors were assembled in a sealed quartz cell containing 1M $LiPF_6$ in (1:1 v/v) EC/DMC electrolyte inside the argon-filled glove box to visually compare the Li-dendrite growth behavior in coated and un-coated samples. For this purpose, deposition and dissolution was performed at a constant current density of 5 $mA/cm^{-2}$ with the capacity of 5 $mAh/cm^{-2}$. With the purpose of preventing unwanted lithium deposition on the current collectors, copper current collectors were not in contact with electrolyte. All of the steps of cell assembly were performed in an argon-filled glove box.

After the electrochemical tests, the cells were disassembled following the electrolyte removal using dimethyl carbonate (DMC, Sigma-Aldrich) and subsequently dried in a vacuum overnight prior to characterization. Next, samples were hermetically sealed inside an air-tight polypropylene bottle (Nalgene, 60 mL) for a safer transfer without contamination to the characterization instruments. All the procedures were executed in an argon-filled glove box. Raith 100 Electron Beam Lithography System was used for SEM imaging. Right before the SEM measurement, all samples were coated with gold (Au) in a Technics Hummer Model V sputter coater (2 mins/100 mtorr) to avoid charging effect. Afterwards, the Au-coated samples were quickly transferred to the SEM analyzing chamber. SEM experiments were performed with an acceleration voltage of 10 kV and a working distance of 5.0 mm. Renishaw inVia Reflex Raman with laser sources of excitation wavelength of 532 nm was used for Raman spectroscopy measurement. TEM images EELS spectroscopy were obtained using a JEOL JEM-ARM200CF STEM equipped with a cold field emission gun with 0.78 Å spatial resolution at 80 kV and a Gatan Enfina EELS system.

The description of different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

The invention claimed is:

1. A battery, comprising:
a separator that is porous; and
a graphene oxide (GO) nanosheet coating coupled to a surface of the separator, wherein the GO nanosheet coating is configured as a buffer layer to permit transport of Li-ions therethrough and to regulate a rate of flow of the transport of the Li-ions, and
wherein the GO nanosheet coating is lithiophilic.

2. The battery of claim 1, wherein a plurality of gaps exist between a plurality of GO nanosheets in the GO nanosheet coating configured to permit and regulate the transport of Li-ions therethrough.

3. The battery of claim 1, wherein a plurality of GO nanosheets in the GO nanosheet coating have a plurality of defective sites and have negatively charged functional groups on a surface of the plurality of GO nanosheets that each permit and regulate the transport of Li-ions therethrough.

4. The battery of claim 1, wherein the separator is a glass-fiber separator.

5. The battery of claim 1, wherein the GO nanosheet coating comprises a plurality of GO nanosheets, each having a thickness of 1 nm.

6. The battery of claim 1, wherein the GO nanosheet coating comprises a monolayer of GO.

7. The battery of claim 1, wherein the GO nanosheet coating has a D band/G band intensity ratio of 0.86.

8. The battery of claim 1, further comprising:
an anode comprising Li-metal; and
a cathode, wherein the separator is disposed between the anode and the cathode and the GO nanosheet coating is arranged facing the anode.

9. The battery of claim 8, wherein the GO nanosheet coating is configured as a physical barrier that suppresses Li-dendritic deposition on the anode and alters growth of Li-dendrites thereby causing uniform deposition of lithium via regulation of the rate of flow of the Li-ion transport through the GO nanosheet coating.

10. A method of using the battery of claim 8, the method comprising:
transporting Li-ions through a plurality of gaps that exist between a plurality of GO nanosheets in the lithiophilic GO nanosheet coating and through a plurality of defective sites within the plurality of GO nanosheets, thereby regulating a rate of flow of the Li-ion transport to the anode.

11. The method of claim 10, further comprising:
suppressing Li-dendritic deposition on the anode via the GO nanosheet-coated separator acting as a physical barrier, thereby altering growth of Li-dendrites and causing dense uniform deposition of lithium on the anode.

12. The method of claim 10, further comprising:
in response to lithium growth on the anode, flexing the GO nanosheet-coated separator and retaining an operating rigidity of the separator, thereby suppressing Li-dendrite growth.

13. The method of claim 10, further comprising:
providing a uniform charge distribution on the GO nanosheet-coated separator via negatively charged functional groups on a surface of a plurality of GO nanosheets in the coating.

14. The battery of claim 1, wherein a plurality of GO nanosheets in the GO nanosheet coating have negatively charged functional groups on a surface of the plurality of GO nanosheets and provide a uniform charge distribution on a surface of the porous separator.

15. The battery of claim 1, wherein the surface of the separator that is coupled to the GO nanosheet coating is uneven or bumpy and wherein the GO nanosheet coating is three-dimensional and integrated into the porous separator.

16. The battery of claim 1, wherein the separator and the GO nanosheet coating are configured to flex in response to lithium growth, to suppress Li-dendrite growth, and to retain an operating rigidity of the battery.

17. The battery of claim 1, wherein the separator is woven.

18. A battery, comprising:
a separator that is porous; and
a graphene oxide (GO) nanosheet coating coupled to a surface of the separator, wherein the GO nanosheet coating is configured as a buffer layer to permit transport of Li-ions therethrough and to regulate a rate of flow of the transport of the Li-ions, and
wherein a plurality of gaps exist between a plurality of GO nanosheets in the GO nanosheet coating and the plurality of GO nanosheets have a plurality of defective sites and have negatively charged functional groups on a surface of the plurality of GO nanosheets that each permit and regulate the transport of Li-ions therethrough.

19. The battery of claim 18, wherein the surface of the separator that is coupled to the GO nanosheet coating is uneven or bumpy and wherein the GO nanosheet coating is three-dimensional and integrated into the porous separator.

20. The battery of claim 18, further comprising:
an anode comprising Li-metal; and
a cathode, wherein the separator is disposed between the anode and the cathode and the GO nanosheet coating is arranged facing the anode.

21. The battery of claim 20, wherein the separator is woven.

22. A battery, comprising:
a separator that is porous; and
a graphene oxide (GO) nanosheet coating coupled to a surface of the separator, wherein the GO nanosheet coating is configured as a buffer layer to permit transport of Li-ions therethrough and to regulate a rate of flow of the transport of the Li-ions, and
wherein the surface of the separator that is coupled to the GO nanosheet coating is uneven or bumpy and wherein the GO nanosheet coating is three-dimensional and integrated into the porous separator.

23. The battery of claim 22, wherein a plurality of gaps exist between a plurality of GO nanosheets in the GO nanosheet coating and the plurality of GO nanosheets have a plurality of defective sites and have negatively charged functional groups on a surface of the plurality of GO nanosheets that each permit and regulate the transport of Li-ions therethrough.

24. The battery of claim 22, wherein the separator is woven.

* * * * *